(12) United States Patent
Brundage

(10) Patent No.: US 7,140,248 B1
(45) Date of Patent: Nov. 28, 2006

(54) SPEED MEASURING DEVICE AND METHOD

(76) Inventor: Scott Brundage, 5113 Copper River Ave., Las Vegas, NV (US) 89130

(*) Notice: Subject to any disclaimer, the term of this patent is extended or adjusted under 35 U.S.C. 154(b) by 0 days.

(21) Appl. No.: 10/383,817

(22) Filed: Mar. 6, 2003

Related U.S. Application Data

(63) Continuation-in-part of application No. 10/350,251, filed on Jan. 22, 2003, now abandoned.

(60) Provisional application No. 60/351,478, filed on Jan. 22, 2002.

(51) Int. Cl.
G01P 15/04 (2006.01)
A63B 69/00 (2006.01)

(52) U.S. Cl. .................. 73/492; 73/493; 473/233; 473/453

(58) Field of Classification Search ........... 73/488; 200/61.85; 307/120–121; 473/233, 453
See application file for complete search history.

(56) References Cited

U.S. PATENT DOCUMENTS

| 3,792,863 | A | * | 2/1974 | Evans ................. 473/223 |
| 4,759,219 | A | * | 7/1988 | Cobb et al. ............ 73/493 |
| 4,967,596 | A | * | 11/1990 | Rilling et al. .......... 73/492 |
| 4,980,575 | A | * | 12/1990 | Schenkel .............. 307/121 |
| 5,056,783 | A | * | 10/1991 | Matcovich et al. ...... 473/453 |
| 5,841,029 | A | * | 11/1998 | Luking ............... 73/514.31 |
| 6,173,610 | B1 | * | 1/2001 | Pace ................... 73/493 |
| 6,280,353 | B1 | * | 8/2001 | Brundage .............. 473/457 |

* cited by examiner

Primary Examiner—Hezron Williams
Assistant Examiner—John C. Hanley
(74) Attorney, Agent, or Firm—Robert Ryan Morishita; Morishita Law Firm, LLC

(57) ABSTRACT

A velocity measuring device is mounted to a support, optionally a wearable support such as a glove, watch, wrist or arm band, or the like. Alternatively, the support is a sports club or removably attaches to a sports club. The velocity measuring device includes a power supply, a velocimeter or accelerometer, and an output device for visually, aurally, or electrically outputting the measured velocity.

15 Claims, 4 Drawing Sheets

SPEED MEASURING DEVICE AND METHOD

RELATED APPLICATION DATA

The present application is a continuation-in-part of U.S. application Ser. No. 10/350,251 now abandoned entitled "Speed Measuring Device and Method" filed Jan. 22, 2003 by Applicant herein which, in turn, claimed the priority of U.S. Provisional Application Ser. No. 60/351,478 entitled "Speed Measuring Device" filed Jan. 22, 2002 by Applicant herein.

FIELD OF THE INVENTION

The present invention relates to speed measuring devices. Specifically, the present device is a wearable speed measuring device for measuring the speed of a sport player's movements.

BACKGROUND OF THE INVENTION

There are many devices known in the art for measuring a sports player's performance during training and competition. Moreover, it is well known to utilize such devices in conjunction with a training regimen to increase strength and body speed. For example, as explained in my prior U.S. Pat. No. 6,280,353 the use of weighted clubs or bats in conjunction with a speed measuring device to achieve a desired club or bat speed can aid a player in increasing the speed with which a ball is struck. As can be appreciated, this result is advantageous in many sports including baseball, softball, golf, tennis, and the like.

Similarly, Cobb, U.S. Pat. No. 4,759,219 discloses the use of a force transducer generating pulses to discern the relative centripetal velocity of a baseball bat. However, the drawback to Cobb, and many other velocimeters and accelerometers, are that the force transducers used can be disrupted by the impact of the club or bat against a ball. Thus, an erroneous reading can result from the use of such a force transducer to measure a velocity when hitting a ball.

SUMMARY OF THE INVENTION

A device for measuring the speed of a user's motion includes a means for continuously measuring speed and generating a signal corresponding to the speed. The measuring means could take many forms including a velocimeter. In an optional embodiment, the measuring means is an accelerometer, including a force transducer, communicating with a processor. In such an optional embodiment, the force transducer measures the centripetal force. The processor samples the centripetal force measurements. The processor calculates the speed of the user's motion using one or more of the centripetal force measurements. In an embodiment in which the path of the user's motion is arcuate, a fixed approximation of the radius of motion or an input radius received at an input device communicating with the processor may also be used to calculate speed.

The measuring means is carried along the path of the user's motion by a support. It is contemplated that the support may be a sports club, such as a baseball bat, tennis racket, golf club, or the like, or an attachment to a sports club. Alternatively, the support could be a wearable support that attaches to the user's body or clothing. The wearable support may take many forms including a glove, watch, wrist or arm band, or the like.

An output device also communicates with the measuring means. The measuring means generates a signal corresponding to the speed for output at the output device. The output device may take the form of a display, annunciator, or an output to another device, such as a computer, for recording and/or analysis.

The device of the present invention is powered by a power source communicating with the measuring means. The power source may take the form of a conventional electrical cell or battery or may use the motion of the wearer to generate power using mechanical, electrical, or piezoelectric means. The power source may be controlled and actuated by a switch. Optionally the switch is of a type that only actuates the power source when the switch is in motion.

In use, the support is secured to the player's body or an object where the motion will occur. The player performs the motion in a manner consistent with the sport or activity to be engaged in, such as baseball, softball, golf, tennis, boxing, or the like. The measuring means measures the speed of the player's motion and transmits a signal to the output device for output thereof.

In an optional embodiment including an accelerometer and processor, the accelerometer measures the centripetal force exerted on the accelerometer and the processor samples the centripetal force measurements from the accelerometer. Using the measurements sampled and either a fixed radius or an input radius, the processor determines the speed of the user's motion and outputs the speed to the output device.

If more than one centripetal force measurement is sampled from the accelerometer, further data processing may be performed by the processor. For example, if more than one centripetal force measurement is sampled from the accelerometer, the processor may optionally select the greatest centripetal force measurement in determining the speed of the user's motion. Similarly, if the user's motion includes an impact, the processor may sample centripetal force measurements from the accelerometer at predetermined intervals and select a centripetal force measurement prior to the impact, optionally immediately preceding the impact, to determine the speed of the user's motion.

DESCRIPTION

Reference is now made to the figures wherein like parts are referred to by like numerals throughout. The present invention is directed to a device for measuring the speed of a user's motion. It is contemplated that the device may have particular application for sports such as tennis, baseball, golf, boxing, and the like.

Figure 1:
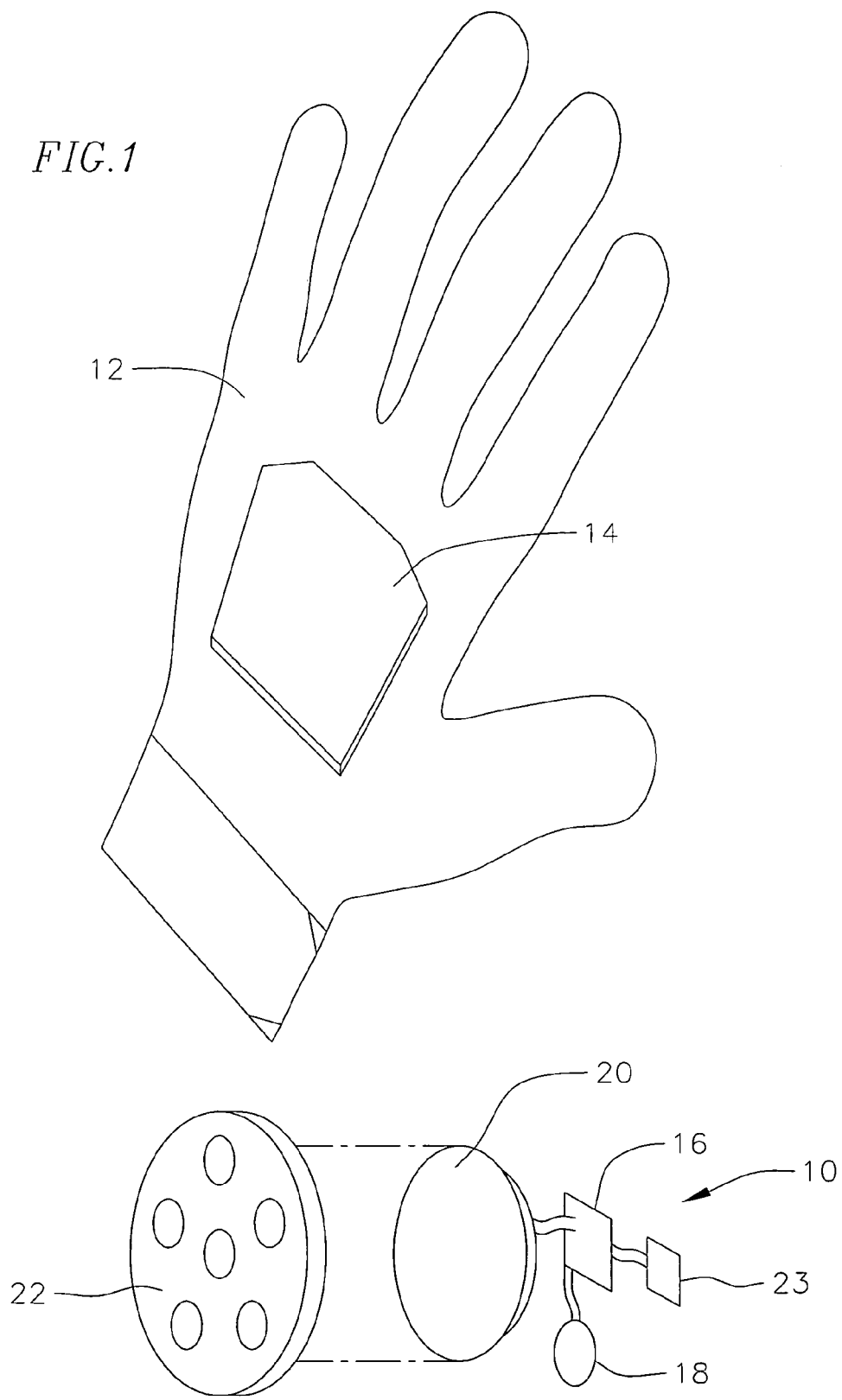
FIG. 1 is a top assembly view of a support and speed measuring device according to an embodiment of the present invention.

Referring to FIG. 1, the present invention includes a means 10 for measuring speed, optionally continuously, and generating a signal corresponding to the speed mountable to a support. Optionally, the measuring means 10 is an accelerometer 16 communicating with a processor 23, such as that described in greater detail below. The support may take the form of a sports club, such as a baseball bat, tennis racket, golf club, or the like. In a further embodiment, the support may be a training sports bat such as that shown in my U.S. Pat. No. 6,280,353. In such an embodiment, the measuring means 10 is mounted to the sports club or mounted in a compartment in the sports club.

In one optional embodiment, a wearable support 12 is provided. The wearable support 12 may take many forms including that of a glove, watch, wrist or arm band, or the like. For example, the embodiment of FIG. 1 shows a wearable support 12 in the form of a glove. The wearable support 12 includes a compartment or mount for holding the measuring means 10. For example, in the embodiment of FIG. 1, a pocket 14 is provided for the measuring means 10. Optionally, the pocket 14 includes a fastener, such as a hook and pile fastener, for closing the pocket 14.

Figure 2:
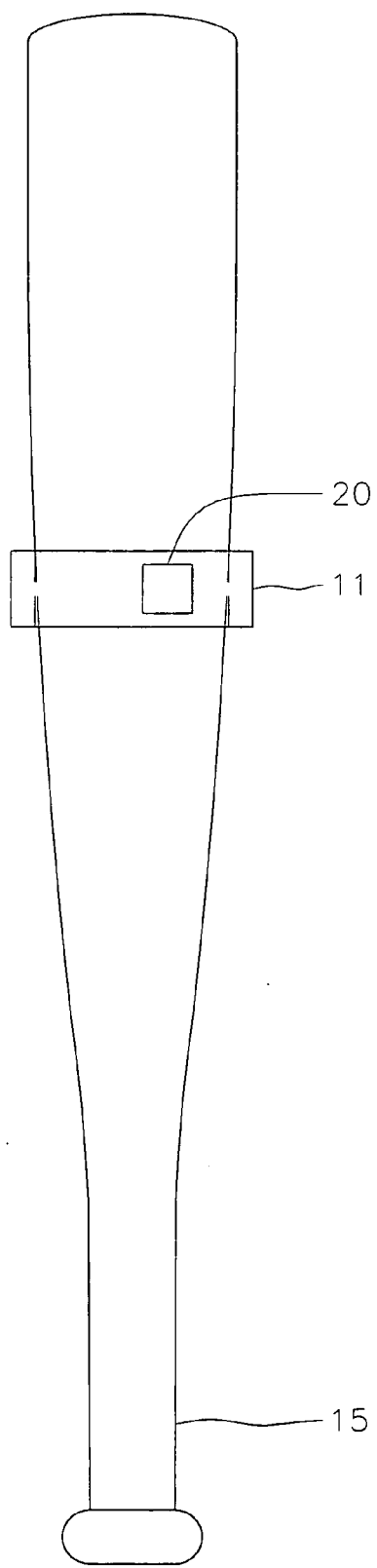
FIG. 2 is a side view of a support and speed measuring device according to an alternate embodiment of the present invention.

In the alternate embodiment of FIG. 2, the support is a sports club or an attachment to a sports club. More specifically, as shown in the optional embodiment of FIG. 2, the support may be an annular ring 11 that is secured to the body of a sports club; in this optional embodiment, the sports club is a baseball bat 15. While there could be an active fastener securing the support to the sports club, in the optional embodiment of FIG. 2, the annular ring 11 is held on the sports club using a friction fit.

Figure 3:
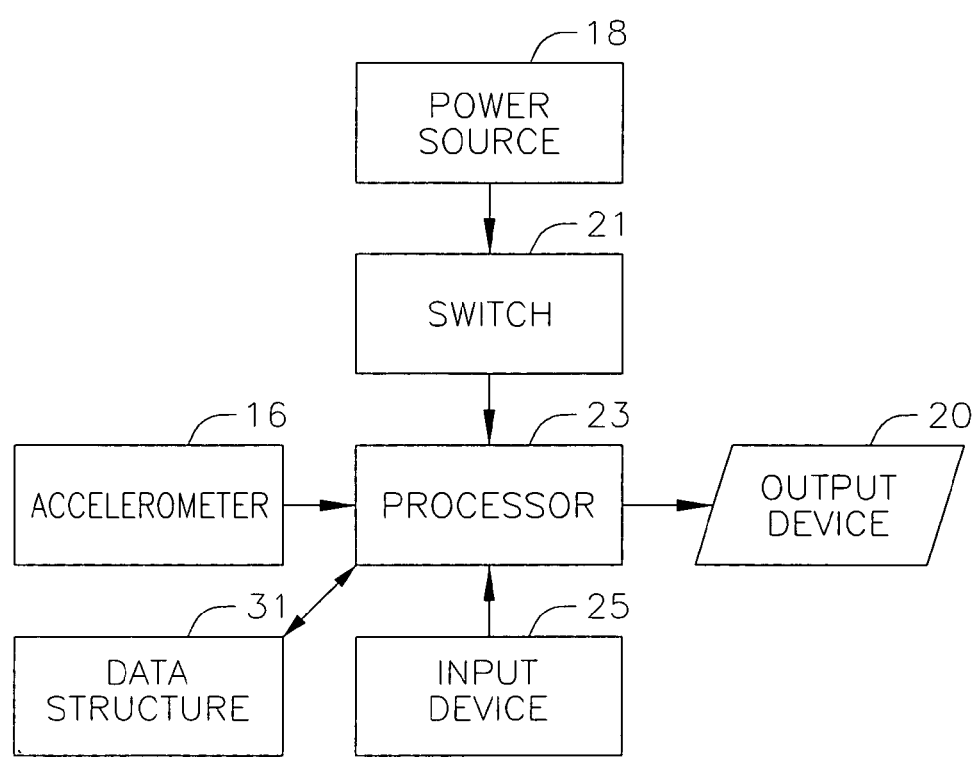
FIG. 3 is a block diagram of a speed measuring device according to an embodiment of the present invention.

Referring generally to FIGS. 1–3, as stated above, the measuring means 10 itself may include a velocimeter or accelerometer 16 measuring the speed of a discrete motion. In an optional embodiment in which an accelerometer 16 is used, shown in FIG. 3, the accelerometer 16 includes a force transducer. Assuming the user's motion follows an arcuate path of a given radius of motion, the force transducer measures the centripetal force on the accelerometer 16 and generates a signal corresponding to the centripetal force. The processor 23 samples the centripetal force signal from the accelerometer and determines the velocity of the motion. As can be appreciated, the centripetal force is proportional to the velocity of the motion. In an optional embodiment, the processor 23 uses the sampled centripetal force measurement and a fixed estimate corresponding to the radius of motion. That is, in such an optional embodiment, the radius is assumed to have a particular value. Alternatively, an input device 25, such as a button, dial, keypad, or the like, may be provided to receive an input radius. Such an embodiment would be suited for a wearable support so that the device could be used in conjunction with a number of different sports clubs. For example, using the flexibility afforded by the input radius, the same device could accurately measure the speed of different clubs, for example a baseball bat and a golf club, by merely entering the relative lengths of the clubs.

Turning back to FIGS. 1 and 2, the measuring means 10 further includes a power source 18 connected to, and powering, the measuring means 10. In an optional embodiment inlcuding an accelerometer 16 and a processor 23, the power source 18 may power one or both of the accelerometer 16 and processor 23. In an optional embodiment, it is contemplated that the power source 18 powers the processor 23. The power source 18 could take any form including an electrical or chemical cell, i.e. a battery, or it could be a mechanical, electrical, or piezoelectric device for translating the motion of the user to electrical energy. Further, a switch 21 could be provided. A switch could take many forms but in an optional embodiment, the switch 21 actuates the power source 18 to power the measuring means 10 when the switch 21 is moving. That is, in such an optional embodiment, the measuring means 10 is only powered when the user is using the device to measure speed.

An output device 20 is connected to the measuring means 10. In an embodiment including a processor 23, the output device communicates with the processor 23. The output device 20 could output the measurement from the measuring means 10 in a visual, aural, or electrical fashion. That is, the output device 20 could be a display for visually displaying the measurement, an annunciator for aurally announcing the measurement, or an electrical output for electrically transmitting the measurement from the measuring means 10. In the latter optional embodiment, the output could be transmitted to many devices such as a personal data assistant ("PDA"), general purpose computer, specific purpose computer, or the like for display, recording and/or analysis. Optionally, the measuring means 10, power source 18, and output device 20 are housed in a housing 22.

Figure 4:
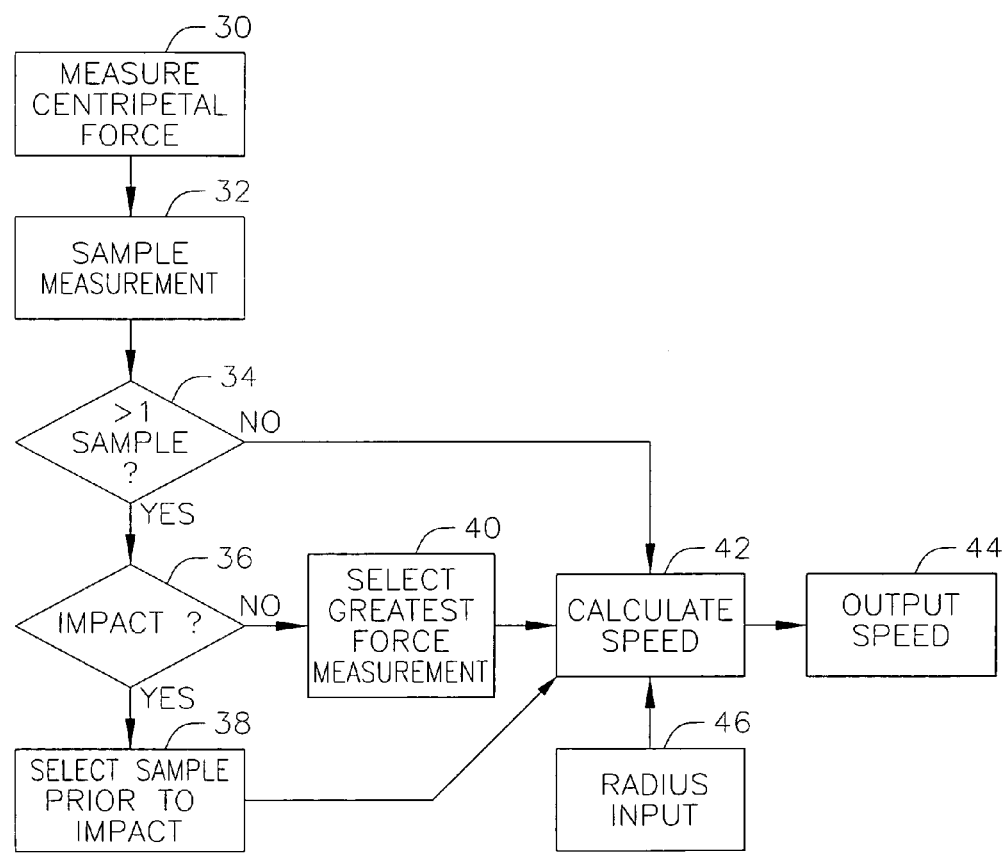
FIG. 4 is a flowchart of a method for measuring speed according to an embodiment of the present invention.

An optional embodiment of a method according to the present invention is shown in FIG. 4. Referring first to an embodiment in which the measuring means 10 is mounted, removably or permanently, to the sports bat, club, or racket, in use, the user simply swings the sports bat, club, racket, or the like. The measuring means 10 measures the speed of the swing and communicates the measurement to the output device 20. As discussed above and shown in FIG. 3, this could take the form of an accelerometer 16 measuring 30 a centripetal force and a processor 23 sampling 32 the centripetal force measurements from the accelerometer 16. The processor 23 could then calculate 42 the speed of the user's motion using a fixed radius or a radius input 46 at an input device 25. The output device 20 outputs 44 the speed by, for example, displaying the speed, announcing the speed, or electrically transmitting the speed. To repeat use, an optional reset button may be used to clear the speed measurement or, in an alternate optional embodiment, the user simply swings again.

Referring to an embodiment in which the measuring means 10 is mounted to a wearable support 12, the user secures the measuring means 10 to the wearable support 12. As discussed above, this mounting may simply be the user inserting the measuring means 10 into a pocket 14 on a glove such as that shown in FIG. 1. The user wears the wearable support 12 on the hand intended to be in motion during the motion. The user performs the motion in a manner consistent with the sport or activity, such as swinging a baseball bat, swinging a racket, swinging a golf club, punching, or the like. Again, the measuring means 10 measures the speed and communicates the measurement to the output device 20. The output device 20 outputs the measurement in a manner previously discussed.

In the situation in which more than one measurement is sampled 34 by the processor 23 from the accelerometer 16, the processor 23 may optionally select 40 the greatest measurement to calculate the speed. Since the speed is directly proportional to the centripetal force, the greatest measurement corresponds to the maximum speed attained during the discrete motion.

In an other optional embodiment in which the user's motion includes an impact 36, such as when hitting a ball, the processor 23 may sample centripetal force measurements from the accelerometer at predetemined intervals. The processor 23 then selects 38 a centripetal force measurement prior to the impact. Optionally, the processor 23 selects a centripetal force measurement immediately preceding the impact. The processor 23 could determine the instant of impact by looking for a sudden change in centripetal force as the energy of the swing is transferred through the impact.

While certain embodiments of the present invention have been shown and described it is to be understood that the present invention is subject to many modifications and changes without departing from the spirit and scope of the invention presented herein.

I claim:

1. A device for measuring the speed of a user's motion in a first direction, comprising:
   an accelerometer including a force transducer;
   a processor communicating with said accelerometer;
   a support carrying said accelerometer along the path of said user's motion;
   an output device communication with said processor; and
   a power source supplying power to said processor such that as said accelerometer is carried by said support along the path of said user's motion, said accelerometer continuously measures the centripetal force exerted on the force transducer throughout the user's motion including during an impact, and generates a signal corresponding to the centripetal force, and said processor samples said signal from said accelerometer including during said impact, selects a centripetal force measurement prior to said impact, calculates the speed of said user's motion using said selected centripetal force measurement, and communicates a speed signal to said output device.

2. The device of claim 1 wherein said user's motion is arcuate with a radius of motion, and said processor determines the speed of the user's motion using said selected centripetal force measurement and a fixed approximation corresponding to said radius of motion.

3. The device of claim 1 wherein said user's motion is arcuate with a radius of motion, further comprising:
   an input device communicating with said processor for receiving an input radius corresponding to said radius of motion, wherein said processor determines the speed of the user's motion using said signal corresponding to said centripetal force and said input radius.

4. The device of claim 1 further comprising:
   a switch communicating with said power source and said processor, said switch only actuating said power source to power said processor when said switch is moving.

5. The device of claim 1 wherein said support is a sports club.

6. The device of claim 1 wherein said support mounts to a sports club.

7. The device of claim 1 wherein said support removably attaches to a sports club.

8. The device of claim 1 wherein said support is mountable to said user's body.

9. The device of claim 1 wherein said user is wearing clothing and said support is mountable to said user's clothing.

10. The device of claim 1 wherein said output device is a display.

11. The device of claim 1 wherein said output device is an annunciator converting said speed signal to an audible announcement of the measured speed of the user's motion.

12. The device of claim 1 wherein said output device is a general purpose computer.

13. A method for measuring the speed of a user's motion in a first direction along an arcuate path with a radius of motion, comprising:
   providing an accelerometer;
   providing a processor communicating with said accelerometer;
   providing an output device communicating with said processor;
   securing said accelerometer to travel along the path of said user's motion;
   carrying said accelerometer along the path of said user's motion, the accelerometer measuring the centripetal force exerted on said accelerometer;
   said processor sampling the centripetal force measurements from said accelerometer throughout the user's motion including during an impact;
   said processor receiving an input radius corresponding to said radius of motion;
   wherein said processor uses the sampled centripetal force measurements to determine when said impact occurred and select a centripetal force measurement prior to said impact, calculates the speed of said user's motion using said selected centripetal force measurement and said radius, and outputs a signal representing said speed to said output device.

14. The method of claim 13 further comprising:
   if more than one centripetal force measurement is sampled from said accelerometer, said processor selecting the greatest centripetal force measurement in determining the speed of said user's motion.

15. The method of claim 13 wherein said output device is an annunciator, the method further comprising:
   the processor generating a signal corresponding to said calculated speed of said user's motion using said selected centripetal force measurement; and
   converting said signal to an audible announcement of the speed measured.

* * * * *